United States Patent [19]

Sclafani et al.

[11] 4,183,479
[45] Jan. 15, 1980

[54] VARIABLE ATTITUDE AIRCRAFT CREW STATION

[75] Inventors: Augustus S. Sclafani, East Northport; Nathan Kirschbaum, Huntington; William C. Tauby, Hicksville, all of N.Y.

[73] Assignee: Grumman Aerospace Corporation, Bethpage, N.Y.

[21] Appl. No.: 847,672

[22] Filed: Nov. 1, 1977

[51] Int. Cl.$^2$ .............................. B64C 1/14; B64C 1/28
[52] U.S. Cl. ............................................................. 244/121
[58] Field of Search ................... 244/121, 120, 118 P, 244/122 R, 129.1, 129.3, 129.4; 296/35 R, 35 A

[56] References Cited
U.S. PATENT DOCUMENTS

| | | | |
|---|---|---|---|
| 2,142,997 | 1/1939 | Case | 244/121 |
| 2,701,899 | 2/1955 | Krupp | 244/129.3 |
| 2,868,477 | 1/1959 | Chaplin | 244/122 R X |
| 3,433,439 | 3/1969 | Brame et al. | 244/121 X |

*Primary Examiner*—Barry L. Kelmachter
*Attorney, Agent, or Firm*—Richard G. Geib; Mellor A. Gill

[57] ABSTRACT

A crew station module that retracts or lowers itself during supersonic cruise flight to provide a small protuberance with adequate pilot vision over the nose and side which module extends or raises itself at takeoff and landing to provide increased downward vision over the nose and sides which module is adaptable for high acceleration cockpit seating i.e. seating that will be adjustable for accommodating variable G-loading upon the occupant such as during combat maneuvers and so forth.

2 Claims, 14 Drawing Figures

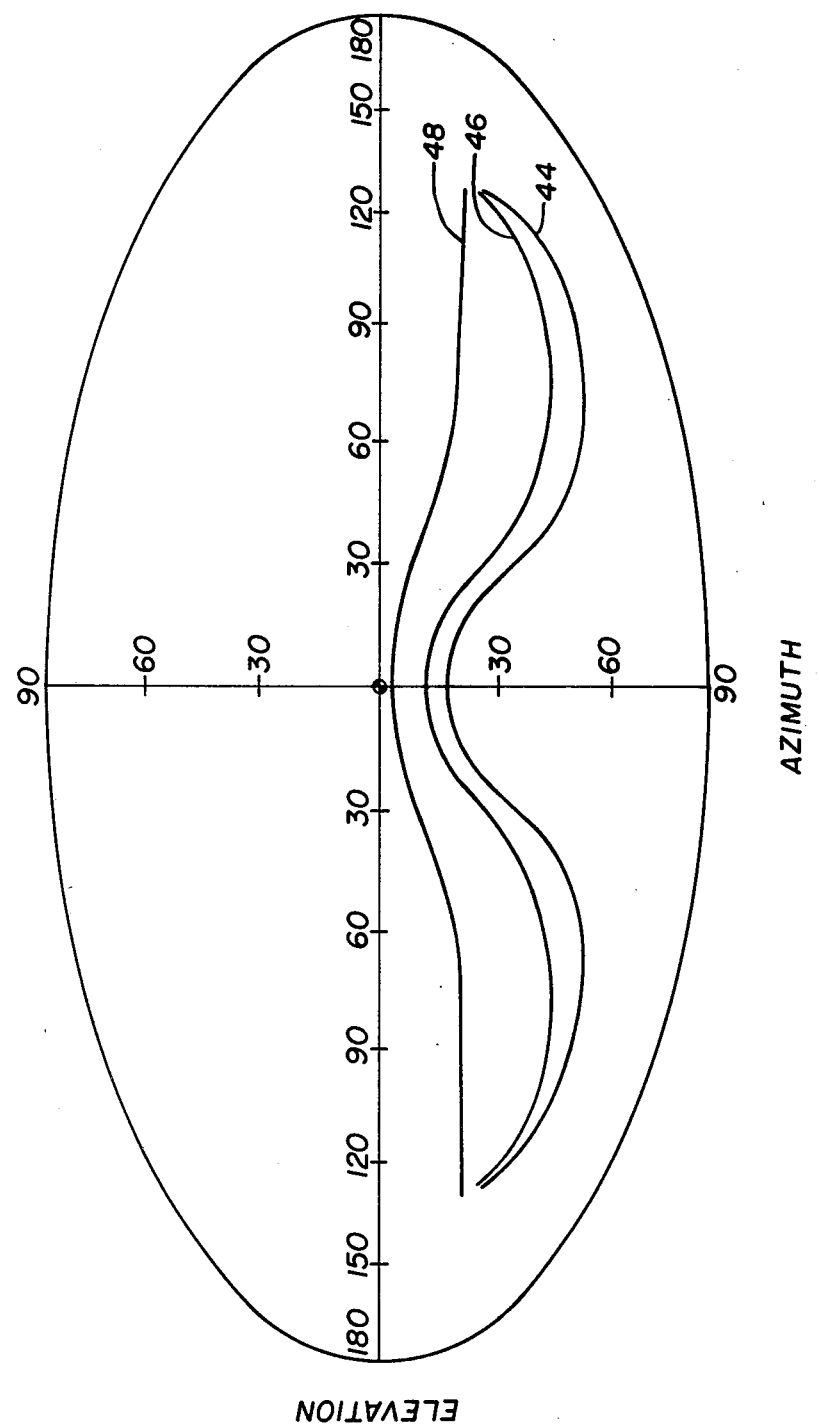

VARIABLE ATTITUDE AIRCRAFT CREW STATION

BACKGROUND

As stated in the U.S. Pat. No. 2,778,586: "Supersonic airplanes must, in the highest degree possible, be of correct streamline shape and extremely smooth as to exterior contour." Heretofore, as seen in this patent and U.S. Pat. Nos. 3,114,526 and 3,334,846 the prior art has had a fixation about a fixed crew station that is faired to the airplane structure by movable fairings that in one attitude will streamline the outward lines of the airplane to the height of the crew station and/or permit a more exposed canopy/windscreen during nonsupersonic regimes of operation of the airplane.

It has also been shown to be an intent of the prior art from the reading of U.S. Pat. No. 2,142,997 that an airplane be provided with a variable windscreen contour coordinated with variable attitude seating that during the greater part of flight is retractable to be completely flush with the surface of the airplane structure during which the crew seats are in their lowermost position to lower drag while affording adequate forward and up vision for such flight regime. In this particular patent a transparent structure is proposed to be essentially in the high-speed regime of flight a roof for the fuselage and which because of the three-point hinging is capable of extending to a more familiar windscreen cabin enclosure providing adequate downward vision for the landing of the aircraft. It is also to be noted that the intent of this patent is to raise and lower the crew seating provision as the transparent structure's profile changes. Other prior art examples of ways to vary canopy/windscreen protruberance may be observed in the German Pat. No. 747,095 published in the United States on June 7, 1946 and Italian Pat. No. 358,223 published Apr. 9, 1938.

The prior art is also illustrative of the manually operated rack and pinion device for raising and lowering a canopy/windscreen for an airplane. This is shown in British Patent No. 446,134 published Apr. 24, 1936. In this patent it is also suggested that the gap between the windscreen and the fuselage may be closed when the windscreen is in its down position by a sliding structure (not shown).

SUMMARY

It is in the improvement of the art of varying aircraft profile for particular flight regimes to obtain a lesser drag and an improved control by taking into consideration the functions of canopy protruberance and fineness ratio in resolving the conflicting demands of efficient high speed flight and safe take-off/landing requirements of a high performance aircraft that this invention finds particular utility.

DRAWING DESCRIPTION

FIG. 14 is a graphical illustration of the vision afforded by the cockpit arrangement and various attitudes thereof as depicted by FIGS. 2, 4 and 6.

DETAILED DESCRIPTION

Figure 1:
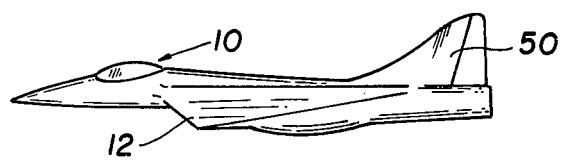
FIG. 1 is a side profile of a supersonic aircraft with which this invention has particular utility.

With more particular reference to FIG. 1 there is shown an aircraft 12 having a cockpit 10 that affords a pilot the best possible location for the visual demands of piloting an airplane. The cockpit 10, as will be further explained hereinafter, is designed so as to be raised or lowered with respect to the external fuselage contour of airplane 12. This will provide a reduction in drag when the cockpit is in a lowered attitude and will provide in such lowered position protection from weapon detonation and penetration as well as reduce detection profile for the nose of the airplane 12.

Figure 2:
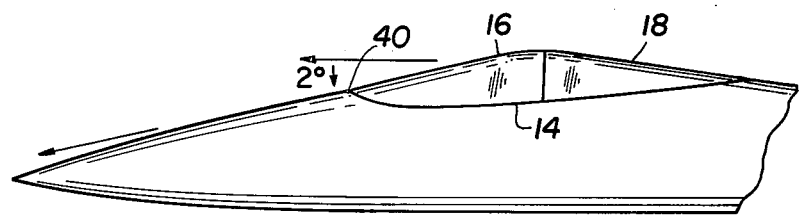
FIG. 2 is a side view of the nose of the aircraft of FIG. 1 showing a cockpit in its supersonic attitude.
Figure 3:
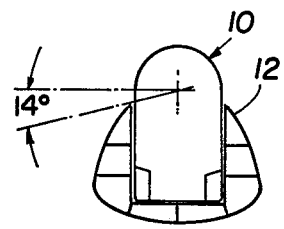
FIG. 3 is a partially cross sectioned end view of the nose section of FIG. 2.
Figure 4:
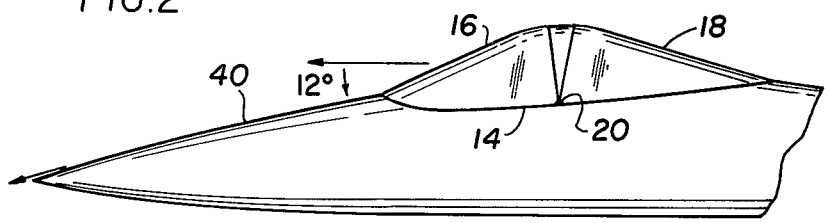
FIG. 4 is a side view of the nose section of the aircraft of FIG. 1 showing the cockpit in a slightly raised attitude from that of FIG. 2.
Figure 5:
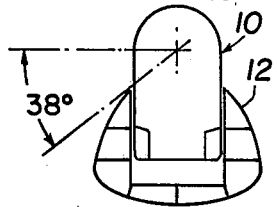
FIG. 5 is a partially cross sectioned end view of the nose section of FIG. 4.
Figure 6:
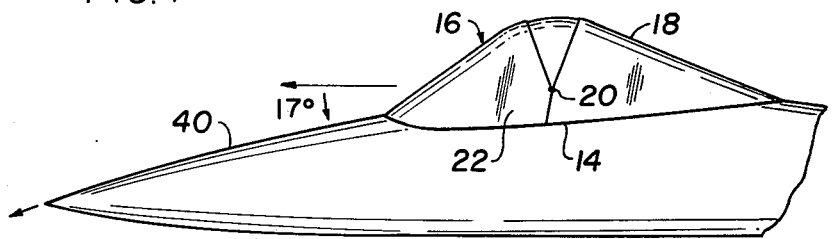
FIG. 6 is a side view of the nose section of the aircraft of FIG. 1 showing the cockpit in its fully extended attitude.
Figure 7:
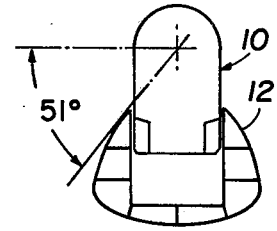
FIG. 7 is a partially cross section view of the nose section of FIG. 6.

As seen in FIGS. 2, 4 and 6 the cockpit attitude varies from one where forward vision straight ahead is from a depressed elevation of 2° to 17° and side vision is inclusive of that above a depressed elevation of 14° through 51°, all measured from the pilot's eyelevel down to the cockpit sill 14. As seen in these figures 2 through 7 the crew station 10 is comprised of a canopy windshield module 16 with an after-fairing structure 18 that are united by a clasp type hinge 20 so that the raising and lowering of the fairing structure is slaved to the raising and lowering of the canopy/windscreen module 16. Crew ingress and egress is made possible by the pivoting of the canopy/windscreen transparent portion 22 about a forward pivot (not shown) and the aft fairing portion 18 about an aft pivot or hinge axis (not shown) substantially like the opening and closing of a clam shell. For raising and lowering of the canopy/windscreen module 16 an actuator 24 is adapted between airplane structure and a fitting 26 from the floor pan 28 of the module 16.

Figure 10:
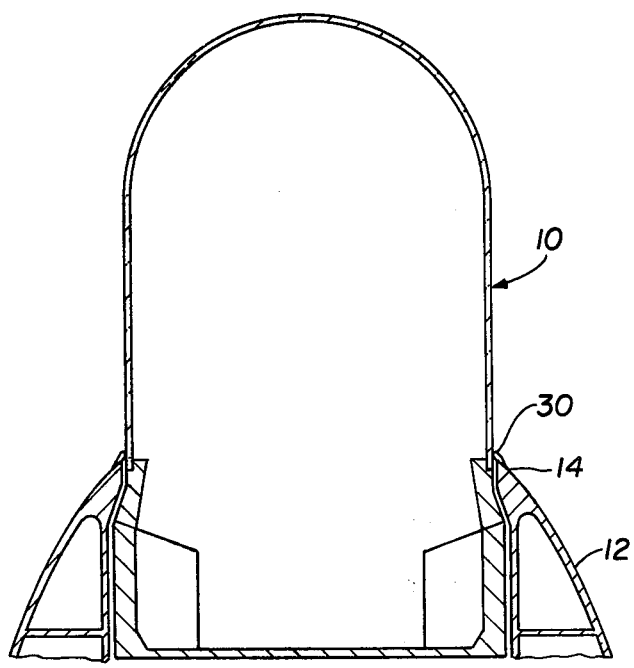
FIG. 10 shows a partially cross sectional view of an aircraft fuselage with a cockpit extended similar to that shown by FIGS. 6 and 7 for better detail of the sealing arrangement between the fuselage and the cockpit.

As is perhaps better seen by the enlarged detail of FIG. 10 an annular seal 30 extends about the opening of the fuselage 12 with the crew station along the sill 14 so as to prevent any air interruptions in whatever attitude of the crew station with respect to the fuselage.

Figure 12:
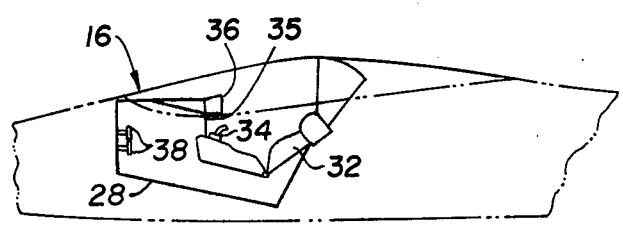
FIG. 12 is a schematic illustration of a cockpit forward section showing a high acceleration crew seat adapted therewith.
Figure 13:
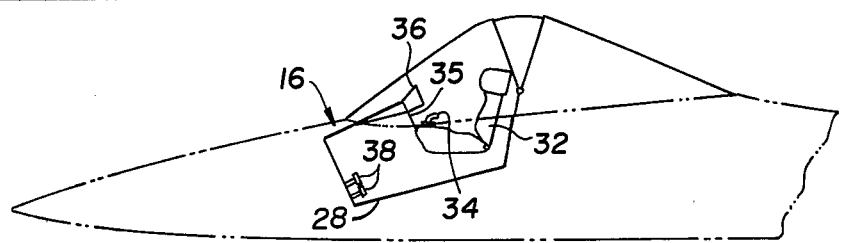
FIG. 13 is a similar schematic of a cockpit as in FIG. 12 showing the high acceleration crew seat in its vertical low acceleration attitude.

As seen in FIGS. 12 and 13 the canopy/windscreen module 16 is a self-contained crew station that preferably incorporates a high acceleration crew seat 32 that is adaptable so that a crew member will have accleration loadings along his spine, i.e. from a normal seating attitude as shown by FIG. 13 with regard to takeoff and landing to one of a more supine nature as shown in FIG. 12 for supersonic cruise. Seat 32 is provided with the usual side arm controller 34, and it is adapted to be ejectable from the module 16 only when it is in the takeoff-landing (upright) attitude of FIG. 13. The module 16 also includes the appropriate instrument panel 35 and a heads up display means 36 as well as the familiar rudder and brake pedals 38. As may be noticed by a comparison of FIGS. 12 and 13 the rudder and brake controls are of a variable attitude structure so as to change position when the seat attitude changes.

As may be readily understood by one skilled in the art this crew station will also contain the appropriate flight propulsion and sensor controls and those personal life support systems as are familiar in aircraft. It should be appreciated that the flight and propulsion controls would either be flexible electrical wiring for flying-by-wire control systems or flexible push-pull cables with the instrumentation and display leads being by flexible electrical wiring conduits or by flexible hose or optical means. Finally as will no doubt be understood by those skilled in the art the electrical wiring, pushpull cables, pneumatic and/or fluid or optical communications are of sufficient length to accommodate the full range of movement of the modules 16 within the airplane's structure.

Actuator 24 is preferably an irreversible hydraulic or electrical linear actuator worm gear of power hinge system. It is controlled by a system also familiar to those skilled in the art that will function automatically as a result of Mach number, flight dynamic pressure, flap or landing gear handle position, or manually.

The seal 30 could be one of an inflatable nature rather than the wiper type shown so long as it restricts air flow and moisture into or out of the aircraft fuselage along the sill surface of the crew station 10.

Figure 8:
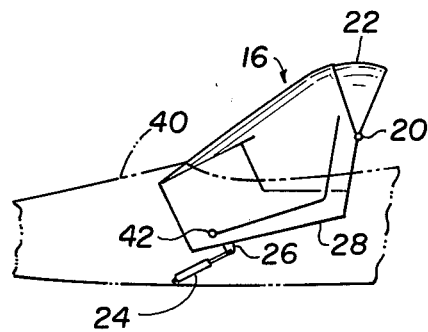
FIG. 8 is a schematic illustration of the forward section of the cockpit utilized by this invention.
Figure 9:
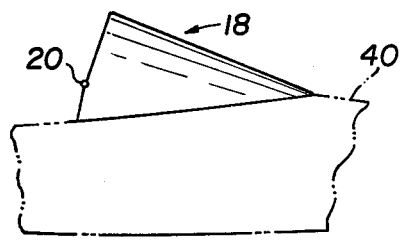
FIG. 9 is a schematic illustration of a fairing structure utilized in a cockpit in accordance with this invention.

With this construction the canopy/windshield module 16 will rotate about pivot axis 42 (See FIG. 8) with respect to a point or line on the interface of the windscreen 22 with the top surface of the fuselage contour 40. The contour of module 16 including the windscreen is shaped to avoid large displacements with respect to the fuselage cavity during raising or lowering.

Figure 11:
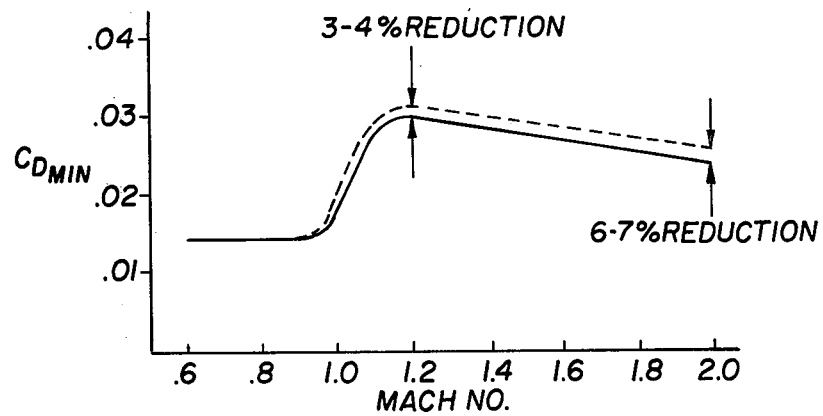
FIG. 11 is a graphical illustration of drag reduction afforded by this invention.

With reference now to the graphical illustration of FIGS. 11 and 14 there is shown by FIG. 11 that the cockpit arrangement of this invention will afford in a typical aircraft 12 a 3% to 4% reduction in the coefficient of drag at Mach No. 1.2 up to a 6% to 7% reduction in the coefficient of drag at Mach 2.0. At the same time as seen in FIG. 3 the visibility afforded by the windscreen can be shown to be more than adequate for takeoff and landing as illustrated by trace 44 through maneuvering as shown by trace 46 to supersonic cruise as shown by trace 48.

An additional advantage of this invention is found in the fact that the vertical tail 50 of an airplane incorporating this invention may be decreased in size in that there has been a reduction in frontal and side profile of the cockpit 12. Reducing frontal and side disturbances will provide a reduction in the destabilizing effect of the cockpit which to a large measure determines the design requirements for tail size, i.e. in view of the decrease of unstabilizing aerodynamics at the forward portion of the airplane the airplane designer may use a lower wetted area at the tail for airplane directional control. This will result in further lightening of the airplane's structure to the advantage of speed and performance to say nothing of energy conservation.

Having described an operative construction of this invention it is now desired to set forth the protection sought by these Letters Patent in the form of the appended claims.

We claim:

1. A variable attitude crew station for an aircraft, said station comprising:
    a crew module pivotally supported in the aircraft about a forward pivot axis, said crew module including,
    crew seat means;
    crew instrument panel means;
    control means, and
    a floor pan and windscreen about the crew seat means, the crew instrument panel means and control means;
    a fairing structure pivotally supported on the aircraft and adapted to telescopically close over the windscreen to provide a closed canopy for the crew module that moves as said crew module is pivoted to fair the aft portion of the canopy to surrounding aircraft structure in whatever attitude of the crew module; said fairing structure and said windscreen having a pivot connection to permit the windscreen's aft area to be telescopically received by the fairing structure; and
    actuator means connected to said crew module so as to rotate said crew module about said pivot axis with respect to a point of interface of the windscreen and aircraft.

2. A variable attitude crew station to optimize the cockpit profile and crew vision needs of an airplane, said station comprising:
    a self-contained cockpit module including crew seat means, controls and instrumentation within a floor pan and a windscreen;
    a means to pivotally support said module within the airplane about a pivot axis that will permit rotation of said module with respect to a point or line at an interface of the windscreen and the airplane so said windscreen varies in height with respect to external contours of the airplane, said means to support including an actuator connected between the airplane and the floor pan to rotate the module about the pivot axis whereupon said windscreen will move outwardly and inwardly of the airplane;
    a fairing structure operably related to, and open to telescopically receive, an aft portion of the windscreen, said fairing structure extending aft to the airplane behind the module with a connection to permit windscreen movement towards and away from said fairing structure as said cockpit module is adjusted from a greater submergence within to a greater protuberance from the airplane by said actuator; and
    a peripheral skirt bridging any gap between the airplane, said module and said fairing to provide an aerodynamic seal about said module and fairing.

* * * * *